(12) United States Patent
Tine, Jr.

(10) Patent No.: US 7,159,699 B1
(45) Date of Patent: Jan. 9, 2007

(54) ADJUSTABLE SHOCK ABSORBER

(76) Inventor: Theodore J. Tine, Jr., 56 High St., Portland, CT (US) 06480

(*) Notice: Subject to any disclaimer, the term of this patent is extended or adjusted under 35 U.S.C. 154(b) by 0 days.

(21) Appl. No.: 10/851,915

(22) Filed: May 21, 2004

Related U.S. Application Data

(60) Provisional application No. 60/472,289, filed on May 21, 2003.

(51) Int. Cl.
F16F 9/50 (2006.01)
B62K 1/00 (2006.01)

(52) U.S. Cl. .................. 188/282.4; 188/282.9; 188/319.1

(58) Field of Classification Search ......... 188/282.4 O, 188/282.8, 282.9 X, 319.1 X, 297, 282.1; 267/217, 218; 280/284
See application file for complete search history.

(56) References Cited

U.S. PATENT DOCUMENTS

| | | | |
|---|---|---|---|
| 3,977,697 A * | 8/1976 | MacPike et al. ............ 280/284 |
| 4,058,181 A * | 11/1977 | Buell .......................... 280/284 |
| 4,183,509 A * | 1/1980 | Nishikawa et al. ......... 267/218 |
| 4,337,850 A * | 7/1982 | Shimokura ............... 188/282.9 |
| 4,653,604 A * | 3/1987 | de Cortanze ................ 280/284 |
| 4,877,226 A * | 10/1989 | Taylor ........................ 188/297 |
| 4,958,706 A * | 9/1990 | Richardson et al. ..... 188/319.1 |
| 5,566,796 A * | 10/1996 | De Kock ................. 188/282.1 |
| 6,042,091 A * | 3/2000 | Marzocchi et al. ...... 188/282.9 |

* cited by examiner

Primary Examiner—Pam Rodriguez
(74) Attorney, Agent, or Firm—Steven M. McHugh

(57) ABSTRACT

A shock absorber is provided and includes a first end adapted for connection to a vehicle, a second end adapted for connection to the vehicle, a case containing a piston rod and a piston valve and a compression adjustment device disposed exterior to the case, wherein the compression adjustment device includes a movable portion associated with an adjustment rod and wherein the adjustment rod is associated with the piston rod such that a flow of fluid within the shock absorber is affected in a manner responsive to a movement of the movable portion.

15 Claims, 15 Drawing Sheets

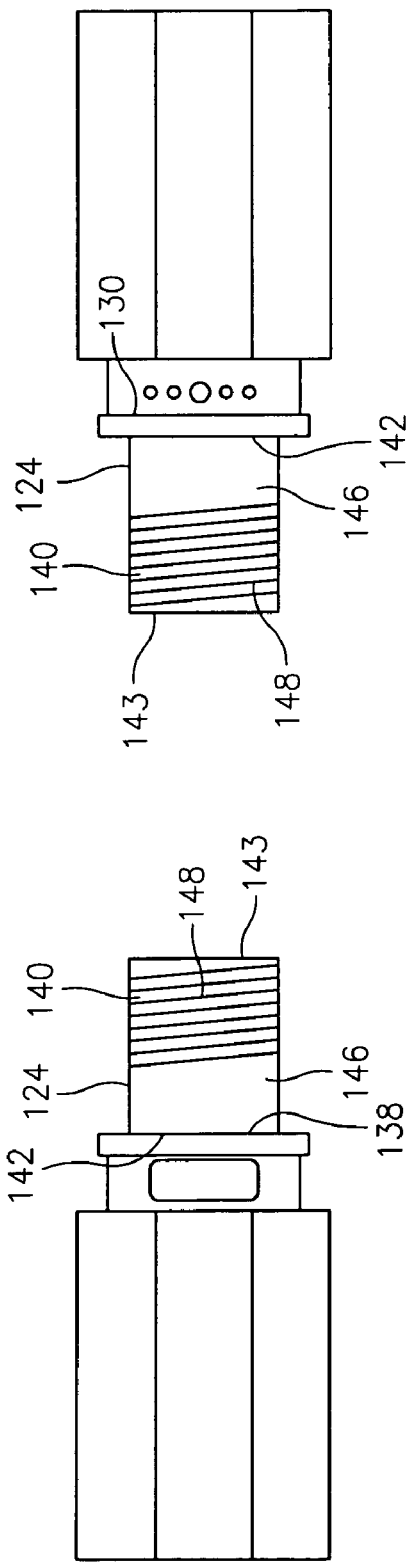

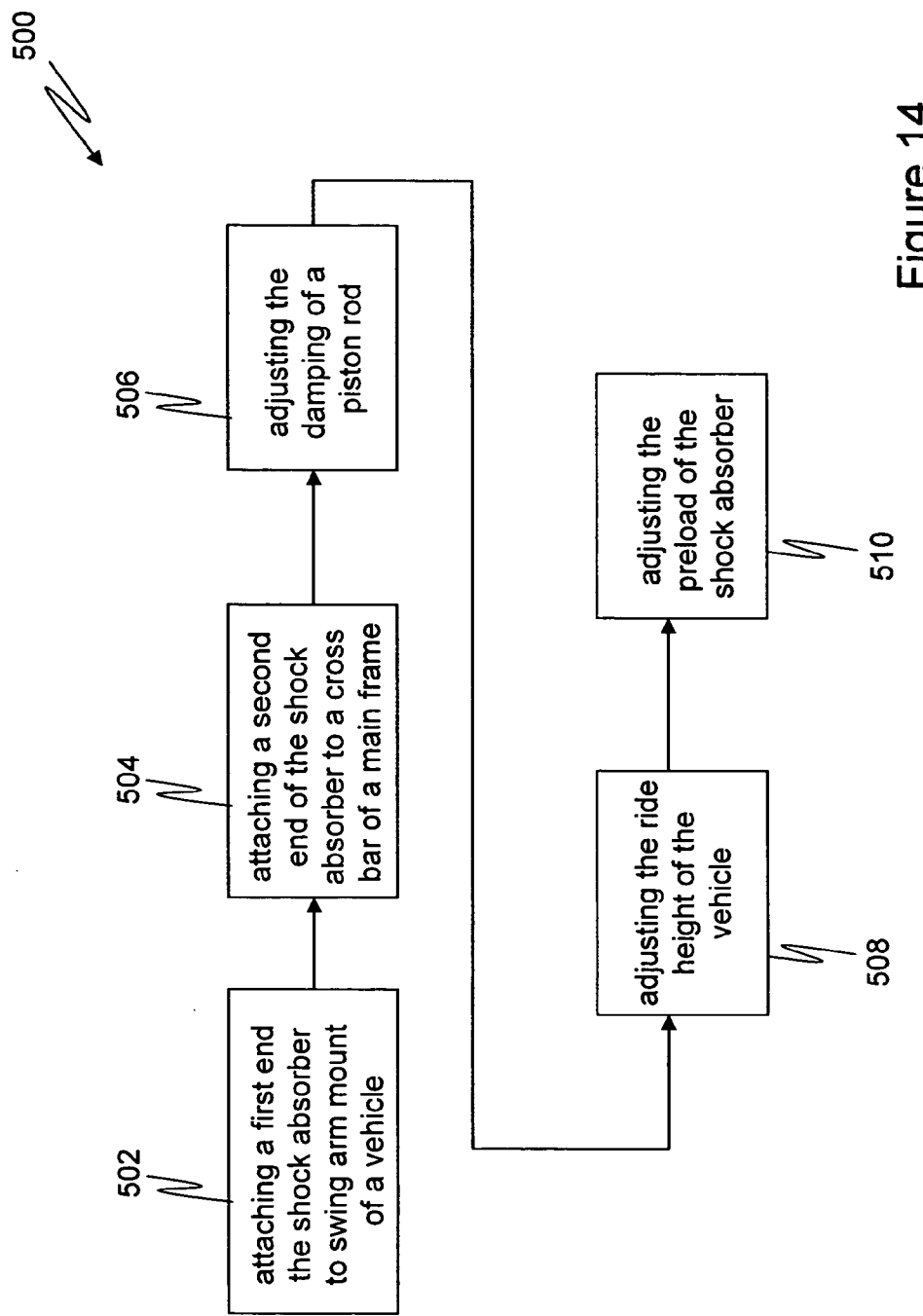

ADJUSTABLE SHOCK ABSORBER

RELATED APPLICATIONS

This application claims priority for U.S. Provisional Patent Application No. 60/472,289 filed May 21, 2003 the contents of which are hereby incorporated by reference herein

FIELD OF THE INVENTION

This invention relates generally to shock absorbers, and, more particularly to an adjustable shock absorber for a vehicle having a swing-arm type suspension system.

BACKGROUND OF THE INVENTION

A shock absorber is a device that is used to absorb a mechanical impact, or shock, sustained by a moving vehicle due to variations in road surface. To accomplish this, a typical shock absorber may include a dampening device, such as a hydraulic or pneumatic piston, to dampen or lessen the effect of jarring sustained by the moving vehicle. For example, one type of shock absorber may include two (2) tubes, one tube telescoping into the other. When associated with a vehicle suspension system, one end of the shock absorber is connected to one end of a vehicle suspension spring and the other end of the shock absorber is connected to the other end of the vehicle suspension spring.

Thus, in order for the vehicle suspension spring to expand, the spring must pull the shock absorber tube apart and in order for the vehicle suspension spring to contract, the spring must push the shock absorber tube together. The vehicle suspension springs and the shock absorbers are used in conjunction with each other to provide the vehicle operator with a more comfortable ride and to prevent the vehicle from becoming unstable. For example, as the tire of a moving vehicle encounters a hole in the road or a raised area in the road surface, the springs may accommodate the resultant shock generated by the impact. However, without a device to help absorb the shock of that impact, the vehicle suspension springs may shake the vehicle's frame excessively and violently. To prevent this, shock absorbers are used in conjunction with the vehicle suspension springs to restrain the motion of the springs.

As can be seen, if the shock absorber offers a large amount of resistance, the motion of the vehicle suspension spring will be effectively restrained. If the shock absorber offers a small amount of resistance, the motion of the vehicle suspension spring will be poorly restrained. Thus, by offering resistance to and by dampening the movement of the vehicle suspension spring, the shock absorber takes away, or absorbs', the movement of the spring and dissipates it as heat. This is typically accomplished by connecting the ends of the shock absorber to a piston in an oil-filled or oil and gas filled chamber disposed within the shock absorber's inner tube. Using this design, the shock absorber may expand and contract only if the piston forces oil and/or gas past it through valves in the shock absorber. This is accomplished by pulling and pushing on the ends of the shock absorber.

When the ends of the shock absorber are pushed together, the fluid and/or gas contained within the compression side of the cylinder is compressed. During this process, a small amount of fluid and/or gas is forced out of the compression side of the cylinder and into the rebound side of the cylinder. When the ends of the shock absorber are pulled apart, the fluid and/or gas contained within the rebound side of the cylinder is compressed forcing a small amount of fluid and/or gas out of the rebound side of the cylinder and into the compression side of the cylinder. This arrangement creates a large resistance to any motion by the piston and consequently by the ends of the shock absorber.

The Harley Davidson® SOFTAIL® motorcycle suspension system uses a swing arm that is pivotally attached to the struts of the motorcycle main frame. This allows the rear wheel assembly to move independently from the frame about a singular pivot axis. Thus, the swing arm rotates about a pivot and allows the wheel to move in an arcuate motion. The swing arm has a pair of wheel mounts that are positioned and spaced to mount a wheel assembly and provide proper orientation and location for the wheel relative to the motorcycle. The swing arm has a pair of supports at each wheel mount, wherein each pair are positioned in a plane and radiate from the wheel mount to a support member that connects the pair of supports in a planar like orientation. Transverse bars, or cross members link each of the wheel mounts to an upper location and a lower location providing proper spacing and structural rigidity for the swing arm. At an intermediate location, positioned between the upper and lower cross members, an additional transverse bar or cross member links each wheel mount. The intermediate cross member is tubular, and provides an axis for the swing arm to rotate about. Each of the support members has a hole that coincides with the tubular shaped cross member, providing a through-hole for pivot bolts to be inserted therethrough. Each support member is positioned adjacent to, and located inside the frame and is therefore hidden by the main frame struts, giving the illusion of a motorcycle having no visible suspension system.

The standard or stock SOFTAIL® motorcycles use a suspension system that incorporates two shock absorbers that are positioned in a parallel relationship to each other and are oriented so the longitudinal axis of the shock absorbers are parallel to the direction of travel of the motorcycle. One end of each of the shock absorbers is attached to the main frame. The other end of each of the shock absorbers is connected to a member that extends forward from the lower cross member of the swing arm. The main frame of the motorcycle hides the shock mounts from view, maintaining the appearance of the SOFTAIL® motorcycle.

Unfortunately, however, due to existing shock absorbers designs, current shock absorbers are not easily installed and when installed they are not easily adjustable.

BRIEF SUMMARY OF THE INVENTION

The above discussed deficiencies and other drawbacks are overcome or alleviated by a shock absorber, wherein the shock absorber includes a first end adapted for connection to a vehicle, a second end adapted for connection to the vehicle, a case containing a piston rod and a piston valve and a compression adjustment device disposed exterior to the case, wherein the compression adjustment device includes a movable portion associated with an adjustment rod and wherein the adjustment rod is associated with the piston rod such that a flow of fluid within the shock absorber is affected in a manner responsive to a movement of the movable portion.

In combination, a vehicle having a swing arm frame system and a shock absorber, the vehicle frame system including a first swing arm member and a second swing arm member, wherein at least one of the first swing arm member and the second swing arm member is movably associated with the vehicle and the shock absorber including a first end adapted for connection to at least one of the first swing arm member and the second swing arm member and the vehicle, a second end adapted for connection to at least one of the first swing arm member and the second swing arm member and the vehicle, a case containing a piston and a piston valve and a compression adjustment device disposed exterior to the case, wherein the compression adjustment device includes a movable portion associated with an adjustment rod, wherein the adjustment rod is associated with the piston rod such that a flow of fluid within the shock absorber is affected in a manner responsive to a movement of the movable portion.

A method of utilizing a shock absorber on a motorcycle, wherein the method includes attaching a first end of the shock absorber to a swing arm mount of a swing arm, attaching a second end of the shock absorber to a cross bar of a main frame, where the main frame and the swing arm are pivotably joined about a pivot axis, adjusting the damping of a piston rod within the shock absorber by rotating a hydraulic compression adjustment ring, provided exterior to a case of the shock absorber, until an audible click is heard and a desired setting is indicated on the adjustment ring, adjusting the ride height of the motorcycle by rotating an adjustment nut positioned about an externally threaded rod to adjust a length of an exteriorly visible portion of the rod and adjusting the preload of a main spring of the shock absorber by rotating a preload adjuster ring provided on a first end of the case, wherein adjusting the damping, adjusting the ride height, and adjusting the preload are performed subsequent to attaching the first end of the shock absorber to the swing arm mount and attaching the second end of the shock absorber to the cross bar.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several Figures:

FIG. 7A shows a side view of the first adjustment structure of FIG. 5A;

FIG. 7B shows a side view of the first adjustment structure of FIG. 5A;

FIG. 14 shows a block diagram describing a method for implementing the shock absorber of FIG. 1 in the motorcycle of FIG. 12.

DETAILED DESCRIPTION OF THE INVENTION

Figure 1:
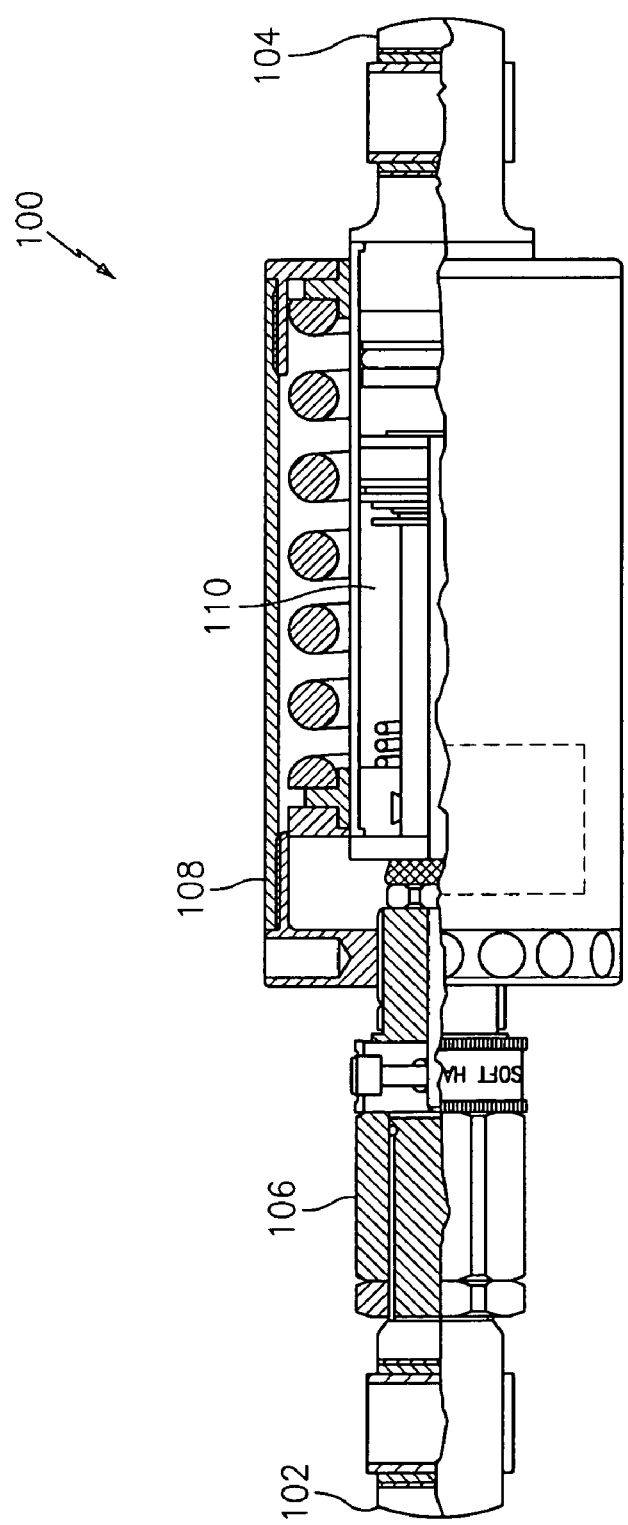
FIG. 1 partial cross-sectional plan view of an adjustable shock absorber.
Figure 2B:
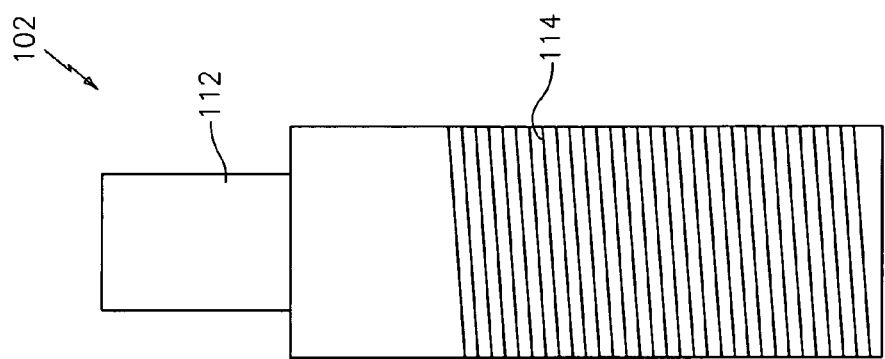
FIG. 2B shows a side view of a first mounting end.
Figure 2A:
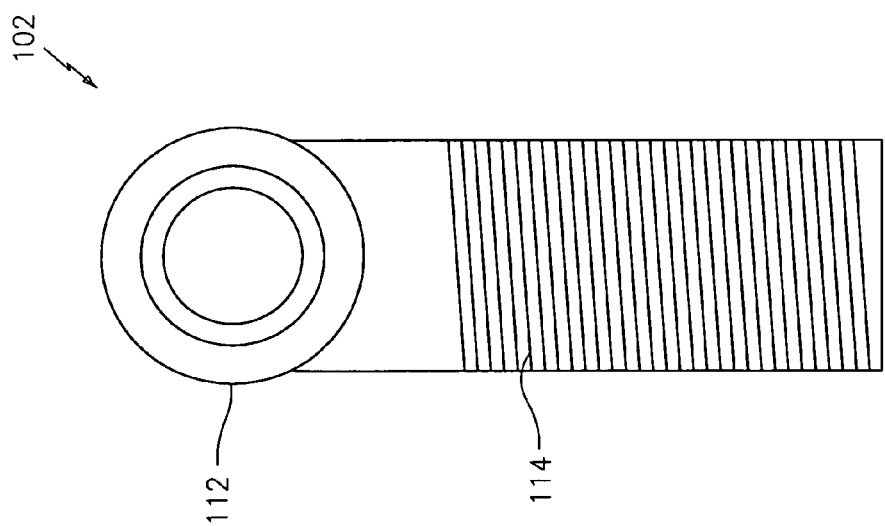
FIG. 2A shows a front view of a first mounting end.
Figure 3A:
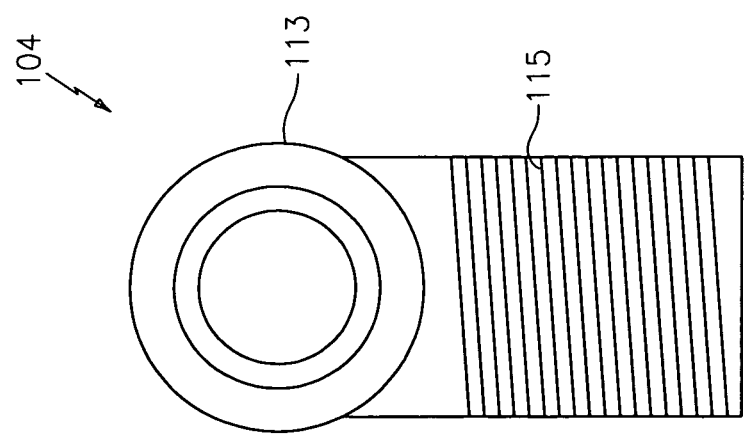
FIG. 3A shows a front view of a second mounting end.
Figure 3B:
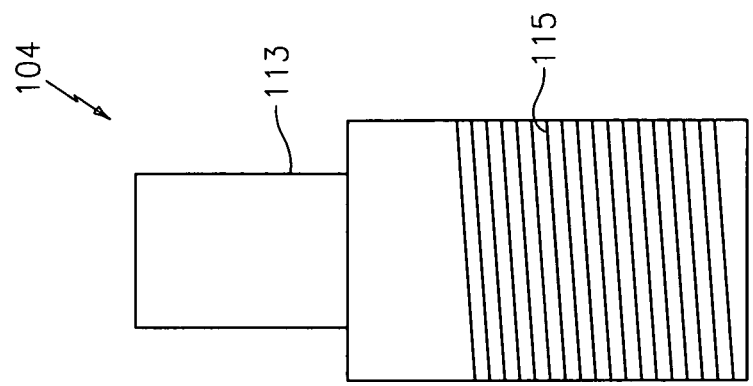
FIG. 3B shows a side view of a second mounting end.

Referring to FIG. 1, a shock absorber 100 is shown and includes a first mounting end 102, a second mounting end 104, an absorber adjustment device 106, a shock absorber case 108 and a piston assembly 110.

Referring to FIG. 2A, FIG. 2B, FIG. 3A and FIG. 3B, first mounting end 102 and second mounting end 104 is shown, wherein first mounting end 102 includes a first vehicle mounting structure 112 and a first mounting end threaded portion 114 and wherein second mounting end 104 includes a second vehicle mounting structure 113 and a second mounting end threaded portion 115.

Figure 4:
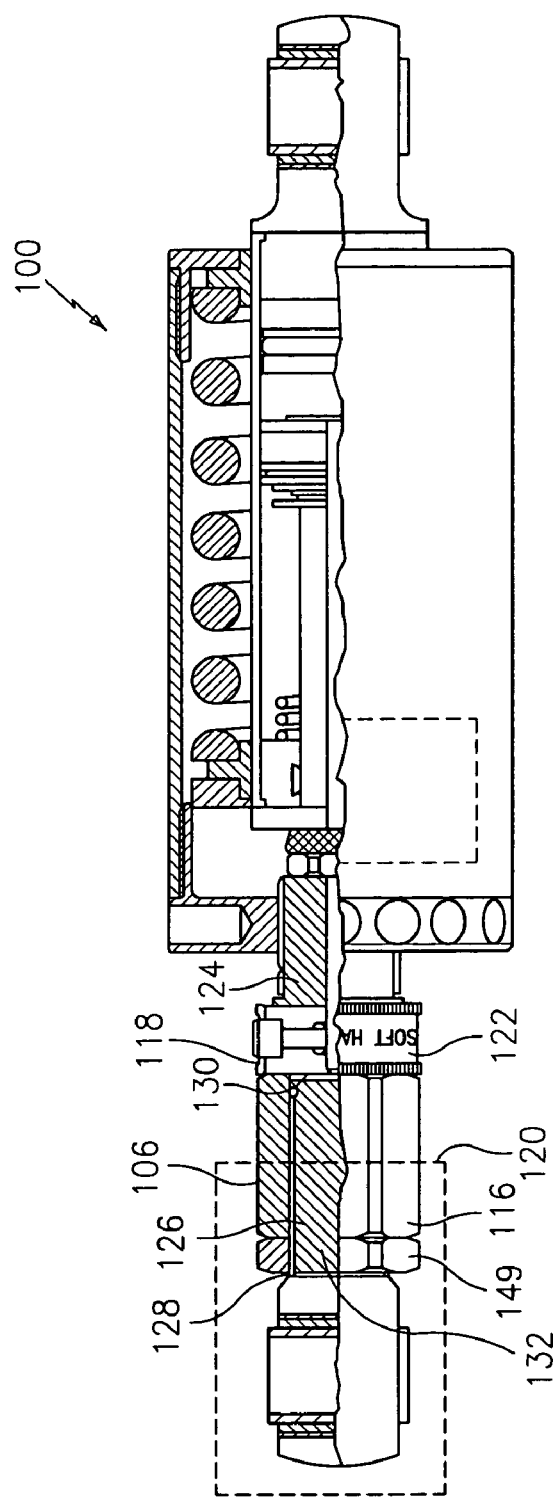
FIG. 4 shows a partial cross-sectional plan view of the adjustable shock absorber of FIG. 1.
Figure 5B:
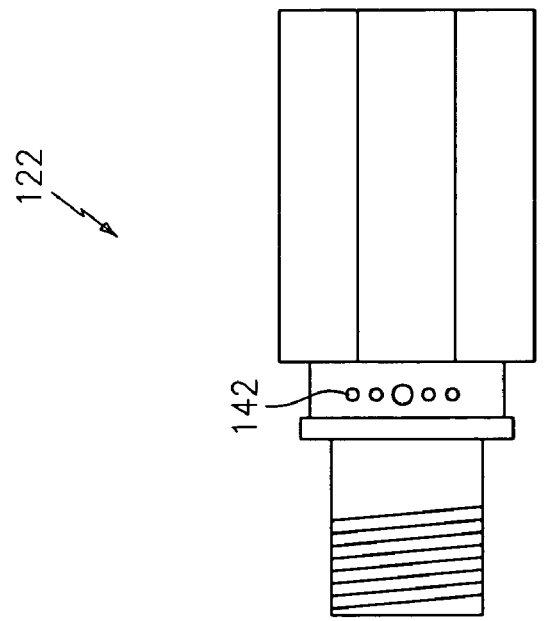
FIG. 5B shows a side view of the first adjustment structure of FIG. 5A.
Figure 5A:
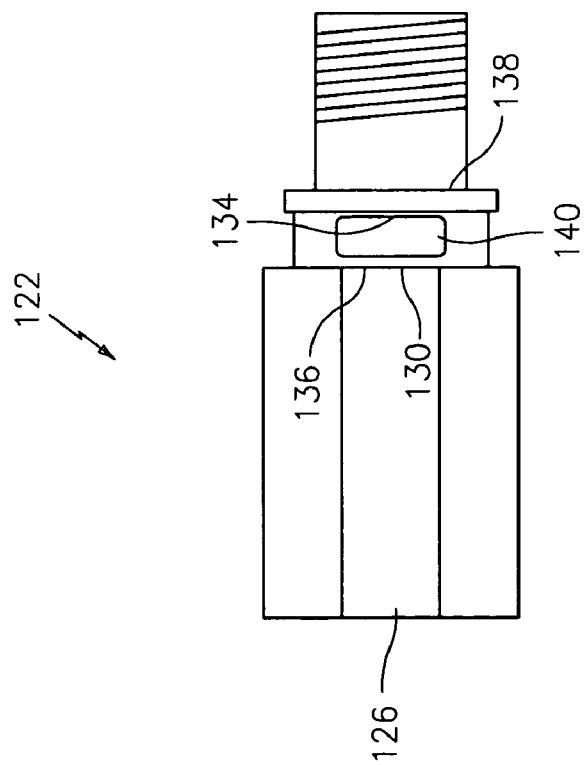
FIG. 5A shows a side view of a first adjustment structure.
Figure 5C:
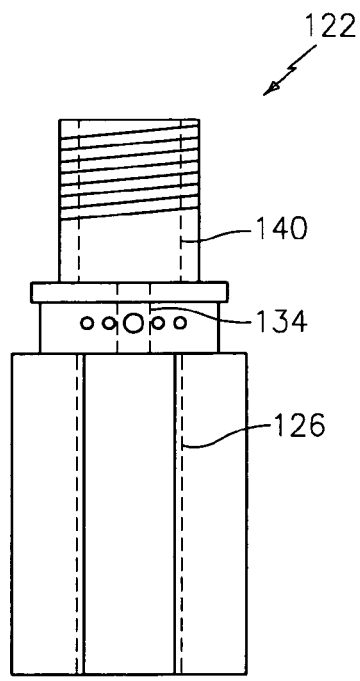
FIG. 5C shows a side view of the first adjustment structure of FIG. 5A.
Figure 6A:
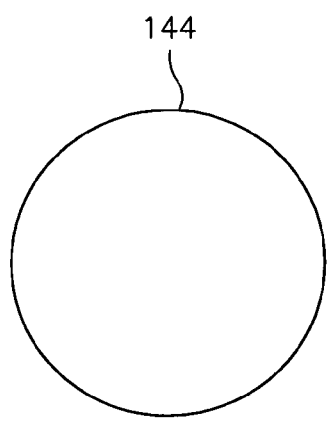
FIG. 6A shows top down view of a ring selector.
Figure 6B:
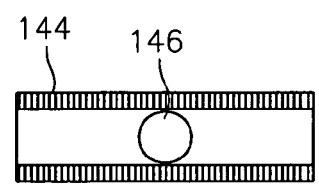
FIG. 6B shows a side view of a ring selector.
Figure 6C:
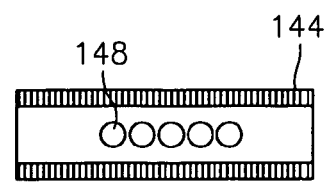
FIG. 6C shows a side view of a ring selector.

Referring to FIG. 4, absorber adjustment device 106 is shown and includes a first adjustment structure 116 and a spring preload adjustment structure 118, wherein first adjustment structure 116 includes a height adjustment portion 120, a compression adjustment portion 122 and a first adjustment structure mounting portion 124.

Height adjustment portion 120 defines a height adjustment cavity 126 and includes a first height adjustment opening 128 and a second height adjustment opening 130, wherein first height adjustment opening 128 and second height adjustment opening 130 are communicated with height adjustment cavity 126. Height adjustment portion 120 also includes a threaded height adjustment portion 132 disposed within height adjustment cavity 126 to be adjacent first height adjustment opening 128.

Referring to FIG. 5A, FIG. 5B, FIG. 6A, FIG. 6B and FIG. 6C, compression adjustment portion 122 defines a compression adjustment cavity 134 having a first compression adjustment opening 136 and a second compression adjustment opening 138, wherein first compression adjustment opening 136 and second compression adjustment opening 138 are communicated with compression adjustment cavity 134. First compression adjustment compression opening 136 is disposed adjacent second height adjustment opening 130 such that compression adjustment cavity 134 is communicated with height adjustment cavity 126. Compression adjustment portion 122 further defines an elongated compression portion side cavity 140 and a plurality of compression notch cavities 142, wherein elongated compression portion side cavity 140 is communicated with compression adjustment cavity 134. Compression adjustment portion 122 further includes a ring selector 144 defining a ring guide cavity 146 and a plurality of ring selector cavities 148, wherein ring selector 144 is movably associated with compression adjustment portion 122 such that plurality of ring selector cavities 148 are associated with plurality of compression notch cavities 142 and such that ring guide cavity 146 is associated with elongated compression portion side cavity 140.

Referring to FIG. 7A and FIG. 7B, first adjustment structure mounting portion 124 defines a first adjustment structure cavity 140 having a first adjustment structure mounting opening 142 and a second adjustment structure mounting opening 143, wherein first adjustment structure mounting opening 142 and second adjustment structure mounting opening 143 are communicated with first adjustment structure cavity 140. First adjustment structure mounting portion 124 includes an adjustment structure internal threaded portion 146 and an adjustment structure external threaded portion 148. As shown, adjustment structure internal threaded portion 146 and adjustment structure external threaded portion 148 are disposed adjacent second adjustment structure mounting opening 143 and first adjustment structure mounting opening 142 is disposed adjacent second compression adjustment opening 138 such that first adjustment structure cavity 140 is communicated with compression adjustment cavity 134.

Figure 8B:
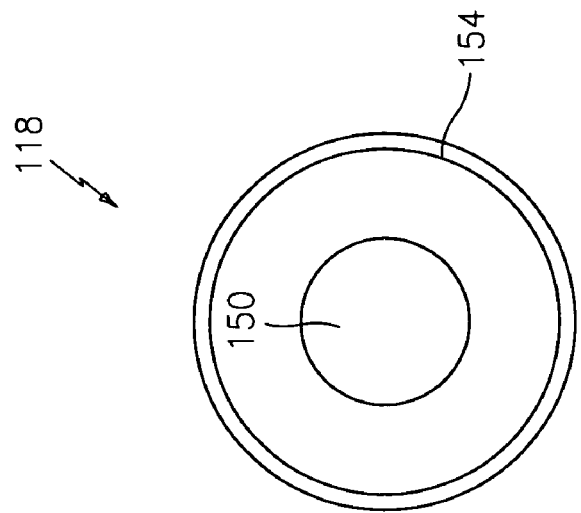
FIG. 8B shows top down view of the spring preload adjustment structure of FIG. 8A.
Figure 8A:
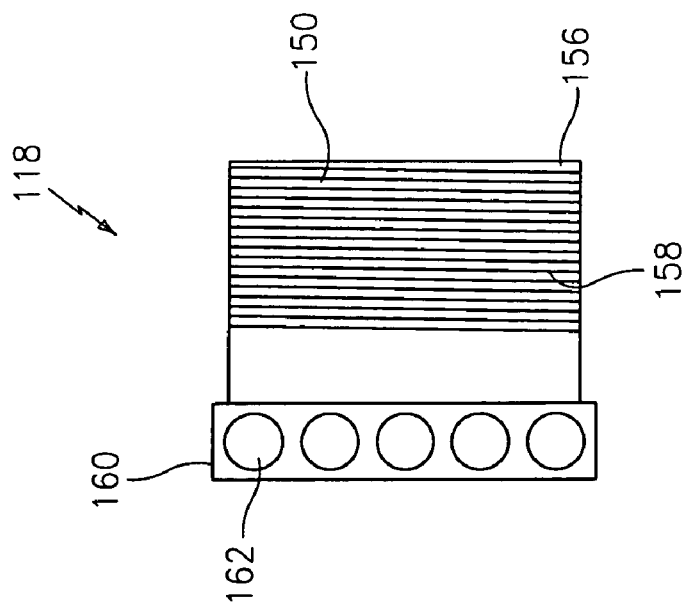
FIG. 8A shows side view of a spring preload adjustment structure.

Referring to FIG. 8A and FIG. 8B, spring preload adjustment structure 118 defines a preload adjustment structure cavity 150 having a first preload adjustment structure threaded opening 154 and a second spring adjustment structure opening 156, wherein first preload adjustment structure opening 154 and second preload adjustment structure opening 156 are communicated with preload adjustment structure cavity 150. Spring preload adjustment structure 118 also includes a threaded mounting portion 158 and a ring portion 160, wherein ring portion 160 includes a plurality of adjustment notches 162.

First adjustment structure mounting portion 124 is associated with spring preload adjustment structure 118 such that adjustment structure external threaded portion 148 is threadingly engaged with first preload adjustment structure threaded opening 154. Once adjustment structure external threaded portion 148 is threadingly engaged with first preload adjustment structure threaded opening 154, a retainer device, such as a bolt, nut or ring clip, may be used on adjustment structure external threaded portion 148 to prevent first adjustment structure external threaded portion 148 and first preload adjustment structure threaded opening 154 from becoming disengaged.

Figure 9:
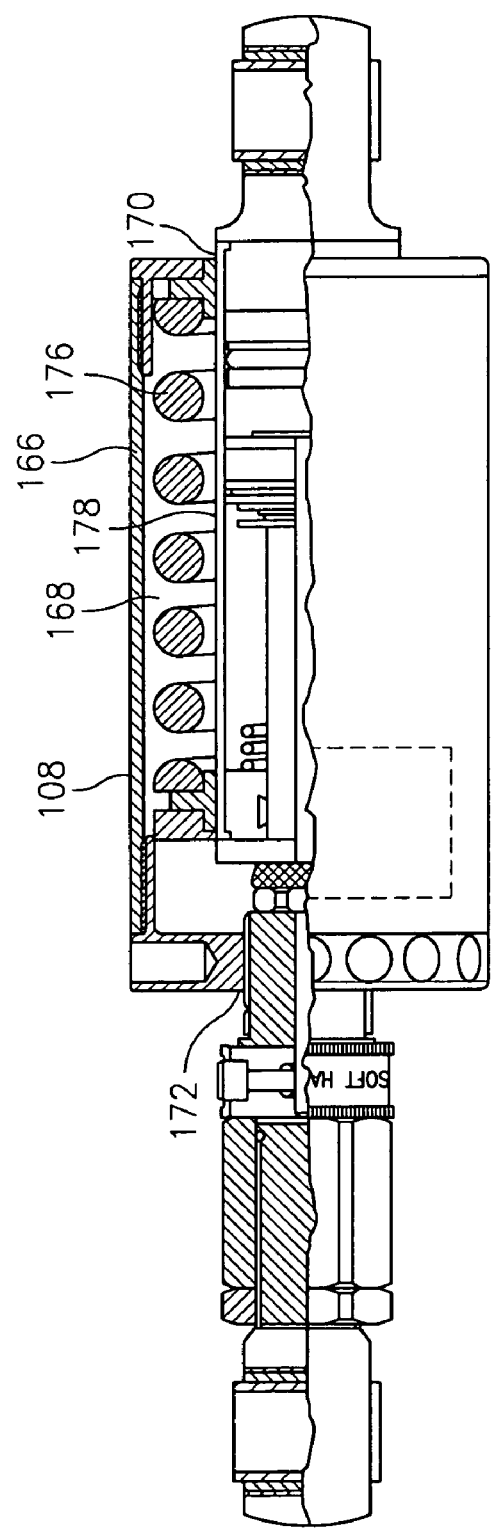
FIG. 9 shows a partial cross-sectional plan view of the adjustable shock absorber of FIG. 1.
Figure 10A:
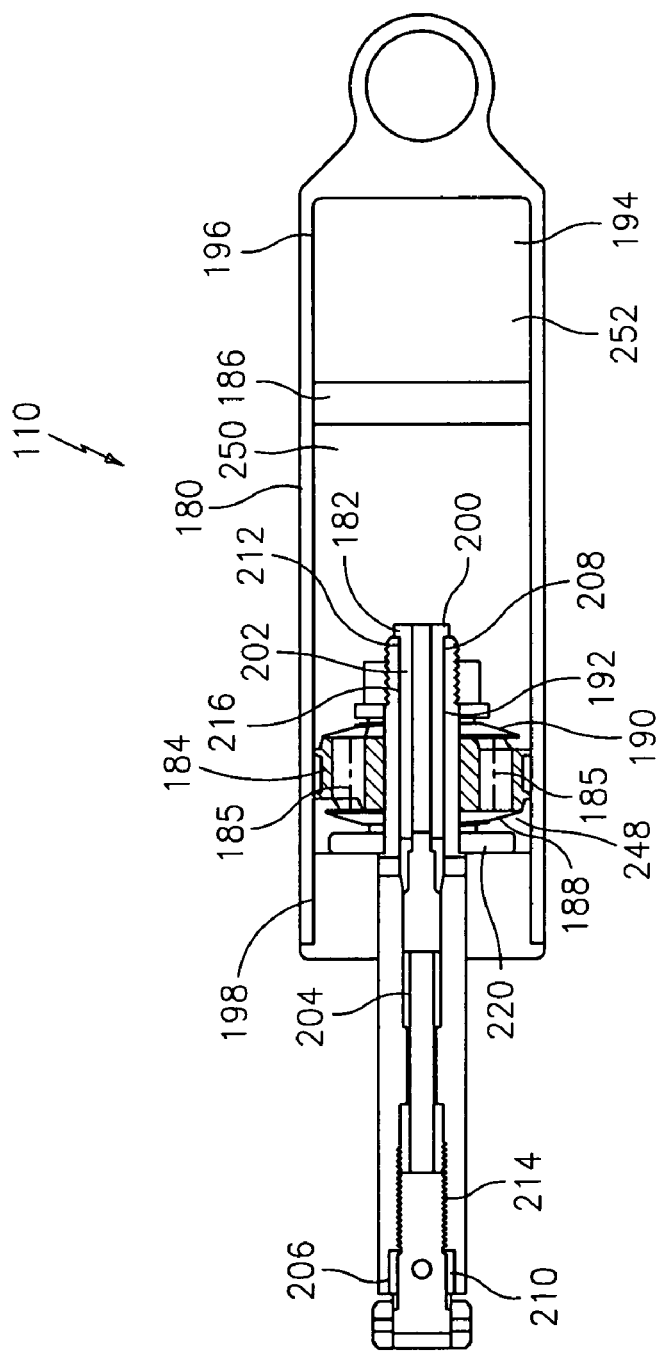
FIG. 10A shows a cross-sectional plan view of the adjustable shock absorber of FIG. 1.
Figure 10C:
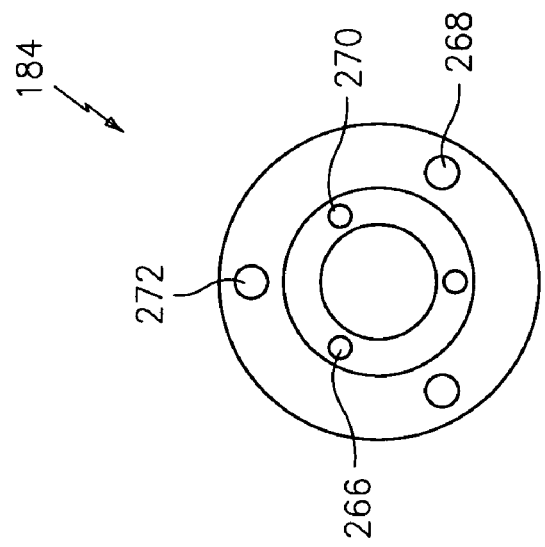
FIG. 10C shows a top down view of a main piston of the shock absorber of FIG. 1.
Figure 10B:
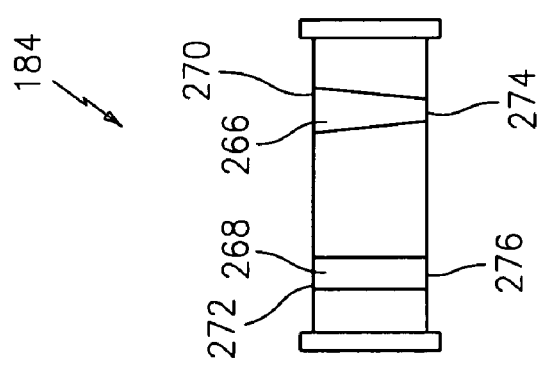
FIG. 10B shows a cross-sectional side view of a main piston of the shock absorber of FIG. 1.
Figure 11:
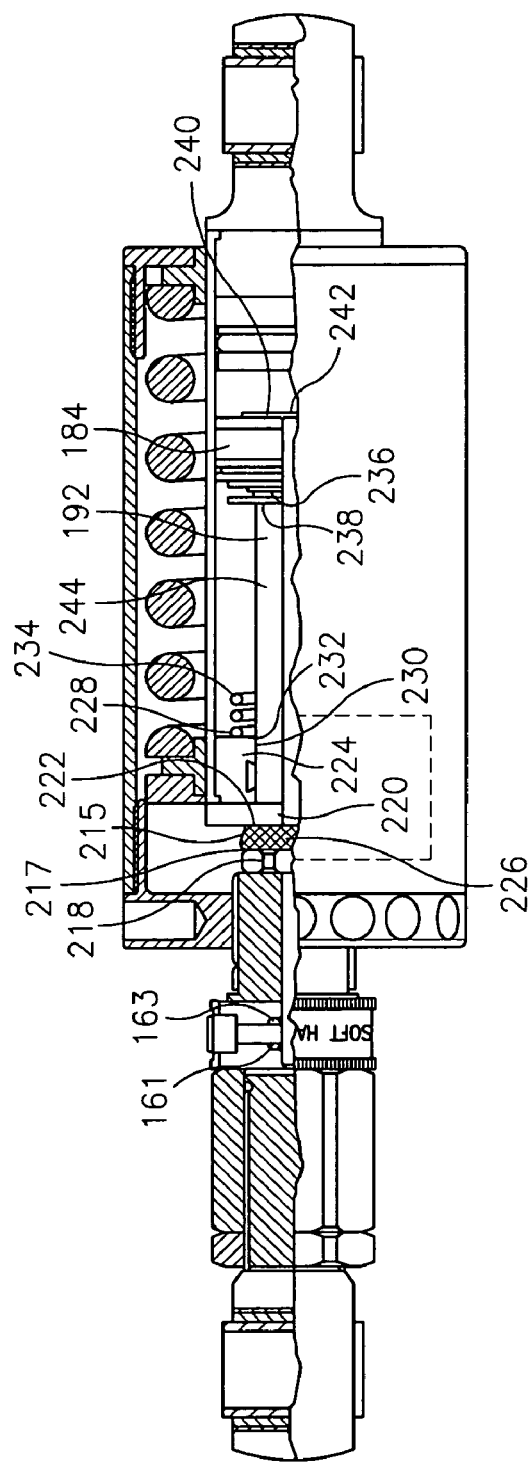
FIG. 11 shows a partial cross-sectional plan view of the adjustable shock absorber of FIG. 1.

Referring to FIG. 9, shock absorber case 108 is shown and includes a case wall structure 166 defining a case cavity 168, a first case opening 170 and a second threaded case opening 172, wherein first case opening 170 and second threaded case opening 172 are communicated with case cavity 168 and disposed on opposing ends of shock absorber case 108. Shock absorber 100 also includes a main spring 176 and defining a spring inner cavity 178 traversing the length of main spring 176.

Referring to FIG. 10A, FIG. 10B, FIG. 10C and FIG. 11, piston assembly 110 is shown and includes a piston body 180, an adjustment rod 182, a main piston 184, a separator piston 186, at least one compression shim 188, at least one rebound shim 190 and a piston shaft 192.

Piston body 180 defines a piston body cavity 194 and includes a first threaded opening 196 and a second threaded opening 198. Adjustment rod 182 includes a rod adjustment knob 200 and a threaded rod portion 202. Piston shaft 192 defines a shaft cavity 204 and includes a first shaft end 206 and a second shaft end 208, wherein first shaft end 206 includes a first shaft opening 210 and second shaft end 208 includes a second shaft opening 212, wherein first shaft opening 210 is communicated with second shaft opening 212 via shaft cavity 204. First shaft end 206 includes a first shaft end threaded portion 214 and second shaft end 208 includes a second shaft end threaded portion 216. Piston assembly 110 includes a limit-switch stopper 215 defining a stopper cavity 217, wherein limit-switch stopper 215 is associated with piston shaft 192 such that piston shaft 192 is disposed within stopper cavity 217 adjacent first shaft end threaded portion 214. A shaft bolt 218 is disposed to be threadingly engaged with first shaft end threaded portion 214 such that piston shaft 192 is retained within stopper cavity 216.

Piston assembly 110 further includes a piston base portion 220 having a first base portion end 222 and a threaded second base portion end 224. Piston base portion 220 defines a first base portion opening 226 disposed in first base portion end 222, a second base portion opening 228 disposed in threaded second base portion end 224 and a piston base portion cavity 230, wherein first base portion opening 226 is communicated with second base portion opening 228 via piston base portion cavity 230. Piston shaft 192 is movingly disposed within piston base portion cavity 230 such that first base portion end 222 is adjacent limit-switch stopper 214. A piston washer 232 is disposed on piston shaft 192 to be adjacent threaded second base portion end 224 and a shaft spring 234 is movably disposed on piston shaft 192 to be adjacent piston washer 232.

Main piston 184 includes a first main piston end 236 defining a first main piston opening 238, a second main piston end 240 defining a second main piston opening 242 and a main piston cavity 244, wherein first main piston opening 238 is communicated with second main piston opening 242 via main piston cavity 244. Moreover, main piston 184 defines at least one inner cavity 266 and at least one outer cavity 268. First main piston end 236 defines at least one first inner opening 270 and at least one first outer opening 272 and second main piston end 240 defines at least one second inner opening 274 and at least one second outer opening 276. The at least one first inner opening 270 is communicated with the at least one second inner opening 274 via the at least one inner cavity 266. The at least one first outer opening 272 is communicated with the at least one second outer opening 276 via the at least one outer cavity 268. It should be appreciated that at least one inner cavity 266 and at least one outer cavity 268 facilitates the compression and rebounds flows within shock absorber 100.

Main piston 184 is associated with piston shaft 192 such that piston shaft 184 is disposed within main piston cavity 244. Main piston 184 also includes compression shim 188 and rebound shim 190, wherein compression shim 188 is disposed on piston shaft 192 adjacent shaft spring 234 and wherein rebound shim 190 is disposed on piston shaft 192 adjacent second shaft end 208.

Referring to the Figures, first mounting end 102 is associated with first adjustment structure 116 such that first mounting end threaded portion 114 is threadingly engaged with threaded height adjustment portion 132. Spring preload adjustment structure 118 is associated with first adjustment structure 116 such that adjustment structure external threaded portion 148 is threadingly engaged with first preload adjustment structure threaded opening 154. Adjustment rod 182 is disposed within shaft cavity 204 such that adjustment rod 182 is protruding from first shaft end 206, rod adjustment knob 200 is protruding from second shaft end 208 and threaded rod portion 202 is threadingly engaged with second threaded opening 198, such that rod adjustment knob 200 is compressingly associates rebound shim 190 with piston shaft 190. Piston assembly 110 is associated with absorber adjustment device 106 such that first shaft end threaded portion 214 is threadingly engaged with adjustment structure internal threaded portion 146 of first adjustment structure mounting portion 124 and such that adjustment rod 182 protruding from first shaft end 206 is disposed within first adjustment structure cavity 140, compression adjustment cavity 134 and height adjustment cavity 126.

Main piston 184 and piston shaft 192 are disposed within piston body cavity 194 such that first threaded opening 196 is threadingly engaged with threaded second base portion end 224. Separator piston 186 is disposed within piston body cavity 194 to be between main piston 184 and second threaded opening 198 of piston body 180. Main spring 176 is associated with piston assembly 110 such that piston assembly 110 is disposed within spring inner cavity 178. Shock absorber case 108 is coveringly associated with main spring 176 and piston assembly 110 such that main spring 176 and piston assembly 110 are disposed within case cavity 168 and such that second threaded case opening 172 is threadingly associated with threaded mounting portion 158. Second shaft end 208 of piston assembly 110 is at least partially protruding from first case opening 170 and second mounting end 104 is associated with piston body 180 such that second mounting end threaded portion 115 is threadingly associated with second shaft end threaded portion 216.

It should be appreciated that main piston 184 is separated from piston base portion 220 by a first piston cavity 248 and separator piston 186 by a second piston cavity 250, wherein first piston cavity 248 and second piston cavity 250 contain a first predetermined fluid, such as oil. It should also be appreciated that separator piston 186 is separated from second mounting end 104 by a third piston cavity 252, wherein third piston cavity 252 contains a second predetermined gas, such as nitrogen.

It should be appreciated that the height of shock absorber 100 may be adjusted as desired, such as when the vehicle experiences a change in load (e.g. different sized drivers or the addition of a passenger) and thus includes an extended configuration and an un-extended configuration. In an un-extended configuration, shock absorber 100 has a first overall length L1 measured from the tip of first mounting end 102 to the tip of second mounting end 104. Similarly, in an extended configuration, shock absorber 100 has a variable second overall length L2, also measured from the tip of first mounting end 102 to the tip of second mounting end 104.

Shock absorber 100 is configurable between un-extended configuration and extended configuration by rotating height adjustment portion 120 such that adjustment structure external threaded portion 148 of first adjustment structure mounting portion 124 threadingly engages first preload adjustment structure threaded opening 154 to dispose adjustment structure external threaded portion 148 farther within preload adjustment structure cavity 150. A retainer device, such as a retainer nut 149 is provided and is threaded onto first mounting end threaded portion 114 to be disposed adjacent height adjustment portion 120. This prevents height adjustment portion 120 from retreating back up first mounting end threaded portion 114. This allows variable second overall length L2 to achieve a variety of shock absorber lengths.

It should be appreciated that during the adjustment process, unscrewing retainer nut 149 will push first mounting end 102 and second mounting end 104 apart and increase the overall length of shock absorber 100, raising the fender away from the back vehicle tire. Thus, instead of the vehicle sagging when there is extra weight on the seat, the back of the vehicle can be raised up using height adjustment portion 120. It should be appreciated that second overall length L2 may be decreased to first overall length L1 by rotating height adjustment portion 120 such that adjustment structure external threaded portion 148 of first adjustment structure mounting portion 124 threadingly engages first preload adjustment structure threaded opening 154 to dispose adjustment structure external threaded portion 148 less farther within preload adjustment structure cavity 150. Retainer nut 149 is threaded onto first mounting end threaded portion 114 to be disposed adjacent height adjustment portion 120 to prevent height adjustment portion 120 from retreating back down first mounting end threaded portion 114. In general, increasing the effective length of shock absorber 100 will raise the rear ride height and decreasing the effective length of shock absorber 100 will lower the rear ride height.

For speeding up or slowing down the damping of adjustment rod 182, shock absorber 100 further includes a cylindrical washer-shaped member 161 which has a member threaded mounting cavity 163 and a central aperture aligned with the longitudinal axis of shock absorber 100. Washer-shaped member 161 is disposed within elongated compression portion side cavity 140 such that adjustment rod 182 is snugly disposed within the central aperture of washer-shaped member 161. Ring selector 144 is disposed such that ring guide cavity 146 is communicated with member threaded mounting cavity 163. Ring selector 144 is associated with washer-shaped member 161 by threadingly associating a threaded bolt or screw with both ring guide cavity 146 and member threaded mounting cavity 163. Thus, as ring selector 144 is rotated, the snug fit of adjustment rod 182 within central aperture of washer-shaped member 161, causes adjustment rod 182 to be rotated as well thereby increase or decreasing the compression on rebound shims 190. Additionally, ring selector 144 also includes a small positioning spring and a small positioning ball placed within a central notch cavity 142 such that when ring selector 144 is rotated, the small positioning ball becomes disposed within one of the plurality of ring selector cavities 148. This provides an operator with an audible "click" when a compression setting has been selected and acts to prevent ring selector 144 from rotating on its own.

When an operator selects which type of hydraulic adjustment is desired, he or she must grasp the ring selector 144 and rotate in the desired direction until the desired setting is achieved. The rotation of the ring selector 144 is about the longitudinal axis of shock absorber 100. It should be appreciated that ring selector 144 may be knurled as shown on the first and second end peripheries of ring selector 144 for easier handling and/or may be smooth in a central strip for clear demonstration of the indicia contained therein. For increasing the damping force and thereby hardening the damping, ring selector 144 should be turned in a predetermined direction. In a "hard" mode, the valves 274 in main piston 184 where the oil comes through is nearly blocked making it difficult for the piston rod 124 to move. To decrease the damping force and thereby soften the damping, ring selector 144 should be turned in an opposing predetermined direction. Movement of piston shaft 192 in shock absorber 100 is much easier in the "soft" mode as the flow of oil is less restricted. For a damping force in between "hard" and "soft", ring selector 144 may be centrally located between the "hard" and "soft" settings. While numerical indicators such as "1, 2, 3, 4, 5" may be employed on ring selector 144 to indicate setting, the use of the more descriptive "soft" and "hard" with arrows indicating which direction ring selector 144 must be moved in order to achieve a harder or softer setting can also be used.

While only five (5) settings are shown, it should be appreciated that there may be a plurality of settings in between the hardest and softest settings. As mentioned above, the small positioning ball allows each station or setting chosen to be accompanied by an audible "click" noise so that the operator will be assured that the appropriate setting is achieved. The click is heard when ring selector 144 is moved into place in one of the settings. This is accomplished by the ball being received within one of the small circular openings corresponding to a particular setting as ring selector 144 is moved. When ring selector 144 is moved, ring selector 144 moves the ball further down into the central detent by compressing the small spring upon which it sits. As the small circular openings of plurality of ring selector cavities 148 corresponding to a different setting passes over central notch cavity 142, the small positioning ball springs slightly back up into the small circular opening of plurality of ring selector cavities 148 and produces the audible "click" noise. Thus, a particular setting can be chosen and confirmed by the click of the ball partially entering the small circular opening. When ring selector 144 is rotated, adjustment rod 182 which is contained within the central aperture of cylindrical member 161 is also rotated about the longitudinal axis of shock absorber 100 to affect the damping of piston assembly 110.

Spring preload adjustment structure 118 is for providing an adjustment of the initial compression of main spring 176. The "spring preload" of shock absorber 100 refers to the amount of adjusted tension applied to main spring 176. The adjustable preload feature gives the operator the ability to apply more tension to main spring 176 if the ride feels too soft, or less tension if the ride feels too stiff. The spring preload adjustment structure 118 operates using threaded mounting portion 158 which is externally threaded and sized to fit within the second threaded case opening 172 which is internally threaded for threadably interacting with threaded mounting portion 158.

When shock absorber 100 is installed, the preload may be adjusted by inserting a tool, such as a wrench or pin type adjuster, into at least one of plurality of adjustment notches 162 and rotating ring portion 160 to be threaded into or out of case cavity 168. As ring portion 160 is rotated farther into case cavity 168, threaded mounting portion 158 contacts main spring 176 directly or through a disc, such as a washer, and compresses main spring 176 against case wall structure 166. Accordingly, as ring portion 160 is rotated out of case cavity 168, threaded mounting portion 158 reduces its compression of main spring 176.

In accordance with an exemplary embodiment, shock absorber 100 operates as follows and includes at least two cycles: a compression cycle 254 and a rebound cycle 256. Compression cycle 254 occurs when piston assembly 110 enters into piston body 180 and rebound cycle 256 occurs when piston assembly 110 withdraws from piston body 180.

During compression cycle 254, the pressure on the compression side of main piston 184 is equal to the pressure on the rebound side of main piston 184. This pressure is created by a pre-applied nitrogen charge into third piston cavity 252. In order for piston assembly 110 to enter piston body 180, oil must pass from second piston cavity 250 into first piston cavity 248. This is accomplished by stroking or applying pressure between first mounting end 102 and second mounting end 104. During the early part of the stroke, the velocity of the stroke is low and oil bypasses main piston 184 through valves 274 in main piston 184. It should be appreciated that the oil flowing through the valves 274 in main piston 184 may be controlled by tightening or loosening adjustment rod 182. This is because as adjustment rod 182 is tightened, rod adjustment knob 200 compresses rebound shims 190 which partially blocks the valves 274 in main piston 184, thus impeding fluid flow through the valves 274 in main piston 184.

The amount of compression pressure by which rebound shims 190 blocks the valves 274 in main piston 184 can be controlled by tightening or loosening adjustment rod 182 via ring selector 144. As the velocity of the stroke increases, the pressure in first piston cavity 248 decreases to a level where compression shim 188 opens, creating a direct path through main piston 184. It should be appreciated that the flow through the valves 274 in main piston 184 is responsive to at least one of shim thickness, shim diameter and quantity of shims used. It should also be appreciated that during compression cycle 254, the oil displaced by piston shaft 190 entering piston body 180 causes a small increase in the total system pressure created by moving separator piston 186 toward third piston cavity 252 thereby compressing the nitrogen contained within.

During rebound cycle 256, a constant pressure is almost achieved in first piston cavity 248 and second piston cavity 250, while pressure in third piston cavity 252 is increasing, allowing oil to pass between second piston cavity 250 and third piston cavity 252. In a similar manner, at low stroke velocities, oil passes through the valves 274 in main piston 184. As the stroke velocity increases, the pressure causes rebound shims 190 to open, thus creating a path through the valves in main piston 184 and oil contained in third piston cavity 252 flows back into second piston cavity 250. It should be appreciated that to compensate for the volume of piston shaft 184 withdrawing from piston body 180, the nitrogen volume within third piston cavity 252 increases, causing a small decrease in total system pressure.

Figure 12:
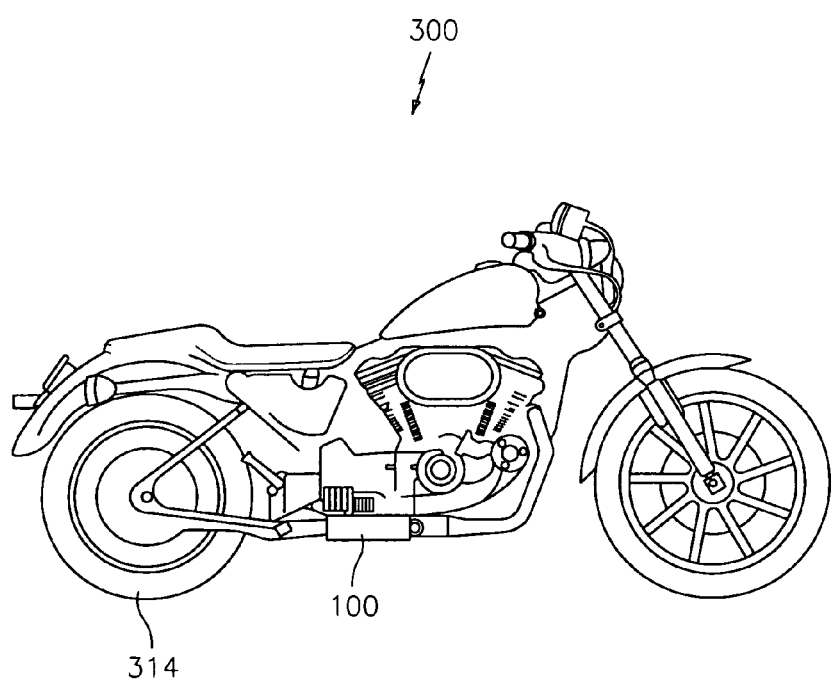
FIG. 12 shows a side view of a motorcycle incorporating the shock absorber of FIG. 1.
Figure 13:
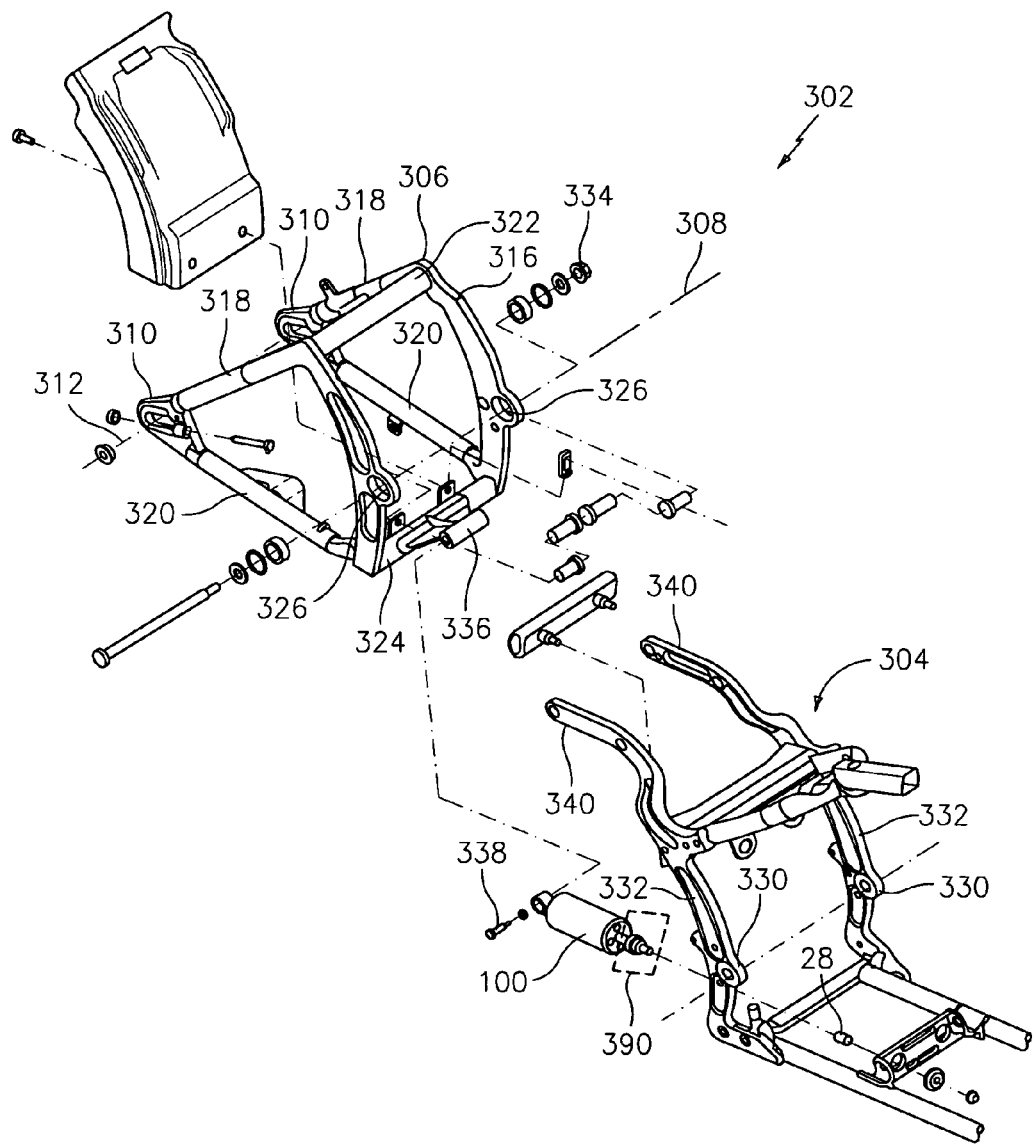
FIG. 13 shows an exploded perspective view of a rear fork assembly for the motorcycle of FIG. 12.

Referring to FIG. 12 and FIG. 13, a vehicle 300 having a swing-arm type suspension system 302 incorporating shock absorber 100 is shown and discussed, wherein vehicle 300 is a Harley Davidson® SOFTAIL® motorcycle.

Suspension system 302 includes a vehicle main frame 304 and a swing arm 306, wherein swing arm 306 is pivotally mounted to vehicle main frame 304 such that swing arm 306 may pivot about a pivot axis 308. It should be appreciated that vehicle main frame 304 and swing arm 306 are symmetrical about the longitudinal axis of vehicle 300.

Swing arm 306 includes wheel mounts 310 located on a rear wheel axis 312 and are disposed to receive a rear wheel 314. Swing arm 306 further includes connectors 316 and a pair of arms 318 and 320, wherein pair of arms 318 and 320 are extending from wheel mounts 310. Connectors 316 are joined by an upper transverse cross member 322 and a lower transverse cross member 324. Disposed within connectors 316 at pivot axis 308 are apertures 326 for receiving an intermediate transverse cross member 328, disposed along pivot axis 308, wherein apertures 326 may have threaded portions at one end or at each end. Intermediate transverse cross member 328 extends through apertures 326 of swing arm 306 and apertures 330 of frame struts 332 and is secured thereto by a securing device 334 which is securingly engaged with intermediate transverse cross member 328. Swing arm 306 is thereby pivotal with respect to vehicle main frame 304 around intermediate transverse cross member 328 disposed along pivot axis 308.

Shock absorber 100 may be secured on either side of vehicle main frame 304 via a swing arm mount 336 on swing arm 306 via a bolt 338 passing through an eyelet of shock absorber 100 and threadingly inserted into swing arm mount 336. An opposite end of shock absorber 100 may be secured to vehicle 300 via a rod connection or via an eyelet-type connection as previously described for swing arm mount 336. It should be appreciated that the opposite end of shock absorber 100 may be connected to a vehicle main frame mount 340 extending from vehicle main frame 304. Thus, shock absorber 100 dampens the relative motions of swing arm 306 when vehicle 100 is being operated. It should be appreciated that such a connection is usable in older models of the Harley Davidson® SOFTAIL® motorcycle, while the above mentioned rod connection is adapted to newer models.

Referring to FIG. 14, a block diagram describing a method 500 for implementing shock absorber 100 is provided and includes attaching a first end of the shock absorber to a swing arm mount of a swing arm, as shown in block 502. Method 500 also includes attaching a second end of the shock absorber to a cross bar of a main frame, where the main frame and the swing arm are pivotably joined about a pivot axis, as shown in block 504. The damping of a piston rod within shock absorber 100 is adjusted, as shown in block 506, by rotating a hydraulic compression adjustment ring, provided exterior to a case of the shock absorber, until an audible click is heard and a desired setting is indicated on the adjustment ring. The ride height of vehicle 300 is adjusted, as shown in block 508, rotating an adjustment nut positioned about an externally threaded rod to adjust a length of an exteriorly visible portion of the rod. The preload of main spring 186 of shock absorber 100 is adjusted, as shown in block 510, by rotating a preload adjuster ring provided on a first end of the case, wherein adjusting the damping, adjusting the ride height, and adjusting the preload are performed subsequent to attaching the first end of the shock absorber to the swing arm mount and attaching the second end of the shock absorber to the cross bar.

It should be appreciated that shock absorber 100 also includes a plurality of washers, bushings and/or seals disposed in areas that require a seal. It should also be appreciated that shock absorber 100 may be attached to vehicle 300 using any type of attachment design, such as a threaded rod attachment 390, as shown in FIG. 13.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A shock absorber comprising:
   a first end adapted for connection to a vehicle;
   a second end adapted for connection to a vehicle;
   a case containing a piston rod and a piston valve;
   a height adjuster, comprising an internally threaded adjustment nut disposed upon an externally threaded rod extending from said height adjuster, wherein rotation of said adjustment nut affects a length of said threaded rod exteriorly visible of said adjustment nut; and,
   a compression adjustment device disposed exterior to said case, said compression adjustment device comprising a movable portion associated with an adjustment rod, wherein said adjustment rod is associated with said piston rod such that a flow of fluid within the shock absorber is affected in a manner responsive to a movement of said movable portion.

2. The shock absorber of claim 1, further comprising an internally threaded retainer nut positioned upon the threaded rod, wherein said retainer nut is movably positionable adjacent the adjustment nut for preventing rotation of the adjustment nut.

3. The shock absorber of claim 1, further comprising a spring preload adjuster, the spring preload adjuster having a movably disposed preload ring for adjusting compression of a main spring.

4. The shock absorber of claim 1, wherein said movable portion is configurable between a plurality of configurations, wherein each of said plurality of configurations affects said fluid flow within said shock absorber such that the rate of fluid flow is at least one of an increased rate or a decreased rate and wherein said fluid flow includes at least one of compression flow and rebound flow.

5. The shock absorber of claim 1, wherein said shock absorber is associated with a vehicle having a swing arm frame system, wherein said swing arm frame system includes a first swing arm member and a second swing arm member, wherein at least one of said first swing arm member and said second swing arm member is movably associated with said vehicle.

6. The shock absorber of claim 5, further comprising an internally threaded retainer device positioned upon said threaded rod, wherein said retainer device is movably positionable adjacent the adjustment nut for limiting rotation of said adjustment nut.

7. The shock absorber of claim 5, wherein the shock absorber further comprises a spring preload adjuster, said spring preload adjuster having a movable preload ring for adjusting compression of a main spring disposed within said case.

8. The shock absorber of claim 7, wherein said preload ring includes a plurality of openings for accepting a tool for moving said preload ring.

9. The shock absorber of claim 5, wherein said movable portion of said compression adjustment device is configurable to increase or decrease flow of a fluid contained within the shock absorber.

10. The shock absorber of claim 9, wherein the outer periphery of said movable portion further includes knurled surfaces.

11. The shock absorber of claim 9, wherein said movable portion is provided with a means for producing an audible click upon configuring said movable portion.

12. The shock absorber of claim 1, wherein the shock absorber is associated with a motorcycle by attaching a first end of the shock absorber to a swing arm mount of a swing arm, attaching a second end of the shock absorber to a cross bar of a main frame, where the main frame and the swing arm are pivotably joined about a pivot axis, adjusting the damping of said piston rod within the shock absorber by rotating a compression adjustment ring, provided exterior to said case of the shock absorber, until an audible click is heard and a desired setting is indicated on the adjustment ring, adjusting the ride height of the motorcycle by rotating said adjustment nut positioned about said externally threaded rod to adjust a length of an exteriorly visible portion of the threaded rod and, adjusting the preload of a main spring of the shock absorber by rotating a preload adjuster ring provided on a first end of the case, wherein adjusting the damping, adjusting the ride height, and adjusting the preload are performed subsequent to attaching the first end of the shock absorber to the swing arm mount and attaching the second end of the shock absorber to the cross bar.

13. The shock absorber of claim 12, wherein the shock absorber is further associated with said motorcycle via selecting, from a plurality of openings on the preload adjuster ring, an opening which is most readily accessible to an operator, inserting a tool in the opening which is most readily accessible, and using the tool to rotate the preload adjuster ring.

14. The shock absorber of claim 12, wherein the shock absorber is further associated with said motorcycle via releasing the adjustment nut for rotation about the threaded rod by rotating an internally threaded jam nut away from the adjustment nut.

15. The shock absorber of claim 12, wherein the shock absorber is further associated with said motorcycle by moving the compression adjustment ring to select indicia indicating a soft, medium, or hard setting.

* * * * *